US012565975B2

(12) United States Patent
Hamar

(10) Patent No.: US 12,565,975 B2
(45) Date of Patent: Mar. 3, 2026

(54) LIGHTING DEVICE FOR A VEHICLE

(71) Applicant: ZKW Group GmbH, Wieselburg (AT)

(72) Inventor: Martin Hamar, Olomouc (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/201,125

(22) Filed: May 7, 2025

(65) Prior Publication Data

US 2025/0383058 A1 Dec. 18, 2025

(30) Foreign Application Priority Data

Jun. 13, 2024 (EP) .................................... 24182035

(51) Int. Cl.

*F21S 41/20* (2018.01)
*F21S 41/24* (2018.01)
*F21S 41/255* (2018.01)
*F21S 41/365* (2018.01)
*F21W 102/135* (2018.01)

(52) U.S. Cl.

CPC ............. *F21S 41/285* (2018.01); *F21S 41/24* (2018.01); *F21S 41/255* (2018.01); *F21S 41/365* (2018.01); *F21W 2102/135* (2018.01)

(58) Field of Classification Search

CPC ........ F21S 41/24; F21S 41/255; F21S 41/365; F21W 2102/135
USPC ............................................ 362/511, 311.02
See application file for complete search history.

(56) References Cited

U.S. PATENT DOCUMENTS 11,560,995 B1 * 1/2023 Lee ......................... F21S 41/24
12,379,085 B2 * 8/2025 Lee ......................... F21S 41/43
2018/0128443 A1 5/2018 Taudt et al.
2020/0063939 A1 2/2020 Qiu et al.
2020/0141550 A1 5/2020 Zhu et al.
2021/0381668 A1 12/2021 Iwasaki
2022/0074564 A1 3/2022 Li et al.
2023/0084958 A1 * 3/2023 Lee ......................... F21S 41/24 362/511
2023/0142357 A1 5/2023 Zhu et al.

FOREIGN PATENT DOCUMENTS

DE 102012211284 A1 1/2014

OTHER PUBLICATIONS

Extended European Search Report for European Patent Application No. 24182035.6 dated Dec. 12, 2024.

* cited by examiner

*Primary Examiner* — Laura K Tso
(74) *Attorney, Agent, or Firm* — Eversheds Sutherland (US) LLP

(57) ABSTRACT

A lighting device for vehicles including a light source, a transparent light guide body with a light coupling area and a projection optics device. The shape of the lower light deflection surface deviates from the shape of a base surface. The shape of the base surface is such that if the lower light deflection surface would not deviate from the shape of the base surface in form of the first facet, the light reflected from the base surface would be projected from the projection optics device into a non-deviation region of the light distribution, wherein the non-deviation region contains a defined point of the light distribution. The first surface element is inclined with respect to the base surface such that light totally reflected by the first surface element is imaged in the light distribution by the projection optics device into an "eraser region" region below the defined point.

20 Claims, 10 Drawing Sheets

LIGHTING DEVICE FOR A VEHICLE

CROSS-REFERENCE TO RELATED APPLICATIONS

This application claims priority to European Patent Application No. 24182035.6, filed Jun. 13, 2024, which is incorporated herein by reference.

TECHNICAL FIELD

The present invention relates to a lighting device for a vehicle, in particular a motor vehicle, the lighting device comprising: at least one light source which is set up to emit light; a transparent light guide body; a light coupling area, which is set up to couple light emitted by the at least one light source into the light guide body; and a projection optics device, for example a projection lens, with an optical axis and a focal point, wherein the light guide body comprises a light exit surface and a lower light deflection surface, the lower light deflection surface and the light exit surface converging in a common edge which runs transversely, preferably perpendicularly, to the optical axis of the projection optics device, wherein light emitted by the at least one light source and coupled into the light guide body via the light coupling region propagates in the light guide body to the light exit surface, emerges from the light guide body, passes through the projection device, and is imaged from the projection optics device as a light distribution with a cut-off line in a region in front of the projection optics device, the edge being imaged as a cut-off line in the light distribution, and wherein at least part of the light propagating in the light guide body is totally reflected at the lower light deflection surface before it emerges from the light guide body through the light exit surface. Furthermore, the invention relates to a vehicle headlight, in particular motor vehicle headlight, comprising at least one lighting device. Additionally, the invention relates to a vehicle, in particular a motor vehicle comprising at least one lighting device or comprising at least one vehicle headlight.

TECHNICAL BACKGROUND

Lighting devices for use in a motor vehicle headlamp for generating a light distribution are well known. Typically, a light source creates and emits light, which is guided to an optical imaging system (secondary optics), in particular a projection optics device, via a transparent light guide body (primary optics). Light emitted by the light source travels through the light guide body mainly via total internal reflection to the light exit surface. In some embodiments, such light guide bodies can also compensate for an off-axis arrangement of the light source and the optical system, wherein such arrangement is due to the design of the lighting device or a vehicle headlamp which uses the lighting device.

The optical imaging system is configured to create together with the primary optics a specific light function or light distribution (e.g. a low beam/passing beam light distribution, a fog light distribution etc.) with the light received from the light source via the light guide body, wherein the shape of the light exit surface, in particular the edge of the light exit surfaces, defines the shape of the light distribution. In particular, the edge of the light exit surface/light guide body defined the form of an upper cut-off line of the light distribution, which is well known for example form low beam light distributions.

However, such lighting devices show the problem that sharpness of the edge, i.e. sharpness of the cut-off line of the light distribution is difficult to control or is not under control, which makes it necessary to provide additional measures on projection optics device, such as micro optics.

It would be desirable to provide a lighting device as mentioned in the introduction which allows to better control the light distribution in a certain region or in certain regions of the light distribution, in particular in a region or regions close to the cut-off line.

SUMMARY OF THE INVENTION

This object is achieved with a lighting device described above, wherein the shape of the lower light deflection surface deviates in a region of deviation from the shape of a base surface, and wherein said region of deviation is located laterally of a longitudinal center plane of the lighting device, which contains the optical axis of the projection optics device, wherein in the region of deviation the lower light deflection surface, deviating from the shape of the base surface is shaped in the form of a first facet, wherein said first facet is a first surface element of the deflection surface which, starting at the edge or in a defined distance from the edge, extends counter to the direction of the optical axis, and wherein the shape of the base surface is such that in the case that the lower light deflection surface would not deviate from the shape of the base surface in form of the first facet, the light reflected from the base surface would be projected from the projection optics device into a non-deviation region of the light distribution, wherein the non-deviation region contains a defined point of the light distribution, wherein the defined point lies below the cut-off line of the light distribution, and wherein a normal vector of the first surface element is inclined to a normal vector of the base surface in the region of deviation by an angle, the first angle, unequal to zero, wherein said first angle is selected such that at least a portion of the light incident on the first surface element is totally reflected, passes through the projection optics device and is imaged in the light distribution by the projection optics device into a region, the so-called "eraser region",

- which is located below the defined point, such that at least a portion of the light, which is totally reflected by the first surface element, is projected into an area outside the defined point in the light distribution, or
- which contains the defined point and is located lower in the light distribution compared to the non-deviating region, such that the luminous intensity in the defined point is reduced compared to the case of the lower surface not deviating in the form of the first facet.

With the invention, light can be better distributed, i.e. part of the light that would be directed into and around the defined point, where it would generate an excessive, impermissible light intensity, is shifted (slightly) downwards in the light distribution so that the light intensity in the defined point is reduced.

The defined point is, for example, point 50L in accordance with ECE regulation R 149, which lies horizontally at −3.43° and vertically at −0.86° in the light distribution (right-hand traffic). For left-hand traffic, this defined point may be point 50R, which is at +3.43° horizontally and −0.86° vertically. Regulation R 149/00 Suppl.7 limits the luminous intensity to <13200 candela for these points for Passing Beam Class C, Class V, Class W.

According to US Standard FMVSS No. 108 said defined point may be test point 0.86 D, 3.5 L. According to National Standard of the People's Republic of China regulation CCC:

GB25991 about "Automotive Headlamps with LED Light Sources and/or LED Modules" the defined point may be point 50L.

In an approach, the shape of the base surface may be approximated in the region of deviation by a plane surface, wherein said plane surface is a tangential surface to the base surface in the edge. The normal vector describing the orientation of the base surface in the region of deviation in this case is the normal vector to said plane tangential surface.

The first surface element, as well as the second and further surface elements which will be described below, are preferably plane. However, these surface elements may alternatively be curved, preferably slightly curved, for example said surfaces are concave or convex.

The surface elements are also described by a normal vector on the surface element. For a definition of the said surface elements by normal vectors, each surface element is approximated by a plane surface. For example, each surface element is bounded by a front, straight edge facing the projection optics device and a rear, straight edge facing the light source. These two straight edges are preferably parallel to each other. The curved surface element is approximated as a flat surface element containing the two edges, the normal vector to this flat surface element corresponds to the normal vector of the curved surface element. These normal vectors define the reference direction for Total-Internal Reflection.

Advantageous embodiments of the invention are described in the dependent claims.

It may be provided that in the region of deviation a second facet is provided, which is a second surface element of the light deflecting surface, which second surface element extends, adjacent to the first surface element, counter to the direction of the optical axis, wherein the second surface element is inclined by a second angle to the normal vector of the base surface in the region of deviation, wherein said second angle is unequal to zero, wherein said second angle is selected such that at least a portion of the light incident on the second surface element is totally reflected, passes through the projection optics device and is imaged in the light distribution by the projection optics device into a region, the so-called "booster region", wherein said booster area is located below the defined point and above a non-booster region, into which non-booster region light would be projected in the case that the lower light deflecting surface would not deviate in the form of the second facet from the base surface.

This additional second surface element allows an even better control of the light intensity. In particular, this second surface element allows to increase the light/luminous intensity at the cut-off line and/or a region below the cut-off line, said region not containing the defined point 50L.

The second surface element is in a distance to the edge of the transparent light guide body which [edge] is arranged close to the focal point of the projection optics device, so that the light hitting the second surface element comes from a slightly defocused area. The projection makes the image larger, the amount of light is distributed over a larger area.

It may further be provided that at least one further facet in the form of a surface element is provided laterally on at least one side of the first and/or the second surface element.

Additional facets allow for an even better control of the light distribution.

For example, one further facet may be provided on each side of the first and second facets.

It may be of advantage if a normal vector of the at least one further surface element is inclined by at least one further angle to the normal vector of the base surface in the region of deviation, wherein said at least one further angle is unequal to zero, wherein the further angle of a further surface element is selected such that at least a portion of the light incident on the further surface element is totally reflected, passes through the projection optics device and is imaged in the light distribution by the projection optics device into a further region, the so-called "further booster region", wherein said further booster area is located above a non-booster region, into which non-booster region light would be projected in the case that the lower light deflecting surface would not deviate in the form of the further facet from the base surface.

For example, the at least one further booster region is located to the side of the defined point and preferably does not contain said defined point.

The one or more lateral additional facets act as light boosters and bring more light up to the cut-off line in horizontal angle ranges lateral to the defined point 50L. For example, as mentioned, if the defined point is at 0.86° down and 3.43° left, corresponding to (−3.43°, −0.86°), one additional lateral facet (which is arranged on one side of the first and/or second facet) directs light into a region left of the defined point 50L from approximately −4.4° to −3.7° horizontal and another lateral facet (which is arranged on the other side of the first and/or second fact) into a region right of the defined point 50L from approximately −3.2° to −2.5°.

Additionally, it may be provided that at least one further facet is provided on each side of the first and/or the second facet, wherein preferably said further facets have identical orientation.

This allows to control the light distributions next to the defined point 50L, especially laterally on both sides.

Preferably, it may be provided that the first and/or the second and/or the at least one further facet is/are in the form of a planar surface element.

As mentioned, the surfaces could also be curved, for example, the first surface element could be curved upwards (convex) and the second surface curved downwards (concave).

The light guide body may comprise an upper light deflection surface, and wherein at least a part of the light emitted by the at least one light source and coupled into the light guide body via the light coupling region is totally reflected at the upper light deflection surface and deflected to the lower light deflection surface, wherein at least a portion of the light incident on the lower light deflecting surface is totally reflected and deflected to the light emitting surface, and wherein a portion of the light impinging on the lower light deflecting surface impinges on the at least one facet.

It may also be provided that coupled-in light strikes the one or more or all facets without prior deflection.

Light which is coupled into the transparent light guide body may travel directly, without any deflection/reflection into the region of deviation, where it is totally reflected by the one or more facets as described above.

It may be provided that the first surface element starts directly at the edge, wherein preferably a section of the edge forms a boundary curve, in particular a boundary straight line of the first surface element.

Alternatively, it may be provided that the first surface element starts at a (small) distance from the edge counter the optical axis towards the position of the light sources.

It may be provided that the second surface element directly adjoins the first surface element.

The first surface element and/or the second surface element and/or the at least one further surface element each may have a rectangular or square shape.

Preferably, the first and second surface element are of equal width, and the lateral boundary lines adjoin each other. The lateral extension of the first surface element can alternatively also widen or preferably taper backwards from the aperture edge towards the second surface element. The resulting shape is a trapezoid. Similarly, the second surface element can also preferably taper or widen. The same may apply for the at least one further surface elements.

It may be provided that the normal vector of the first surface element and/or the normal vector of the second surface element and/or the normal vector of the at least one further surface element is/are parallel to a longitudinal center plane.

For example, the first angle between the normal vector of the first surface element and the normal vector of the base surface is in a range from 0.25° to 4.0°, preferably in a range from 1° to 4°, and/or the second angle between the normal vector of the second surface element and the normal vector of the base surface is in a range from 0.25° to 4.0°, preferably in a range from 0.5° to 2°, and/or the at least one further angle between the normal vector of the at least one further surface element and the normal vector of the base surface is in a range from 0.25° to 4.0°, preferably in a range from 0.25° to 2°, wherein preferably the normal vector of the second and of the at least one further surface element is inclined to the opposite as the normal vector of the first surface element with respect to a plane containing the normal vector of the base surface.

It may be provided that the base surface is designed in such a way that without modification by the first facet the light distribution at the defined point would have a luminous intensity which is above a permissible maximum luminous intensity in said defined point.

The base surface may be plane, typically the base surface is curved. For example, cutting the light guide body along cutting planes parallel to the longitudinal center plane may result in convex sectional curves for the base surface, for example with parabolic shape. These sectional curves may be identical in all parallel cutting planes.

Regarding the upper deflecting surface it may be provided that said upper deflecting surface is curved or planar or faceted.

BRIEF DESCRIPTION OF THE DRAWINGS

The invention is explained in more detail below with reference to the drawings.

DETAILED DESCRIPTION OF EMBODIMENTS

Figure 1:
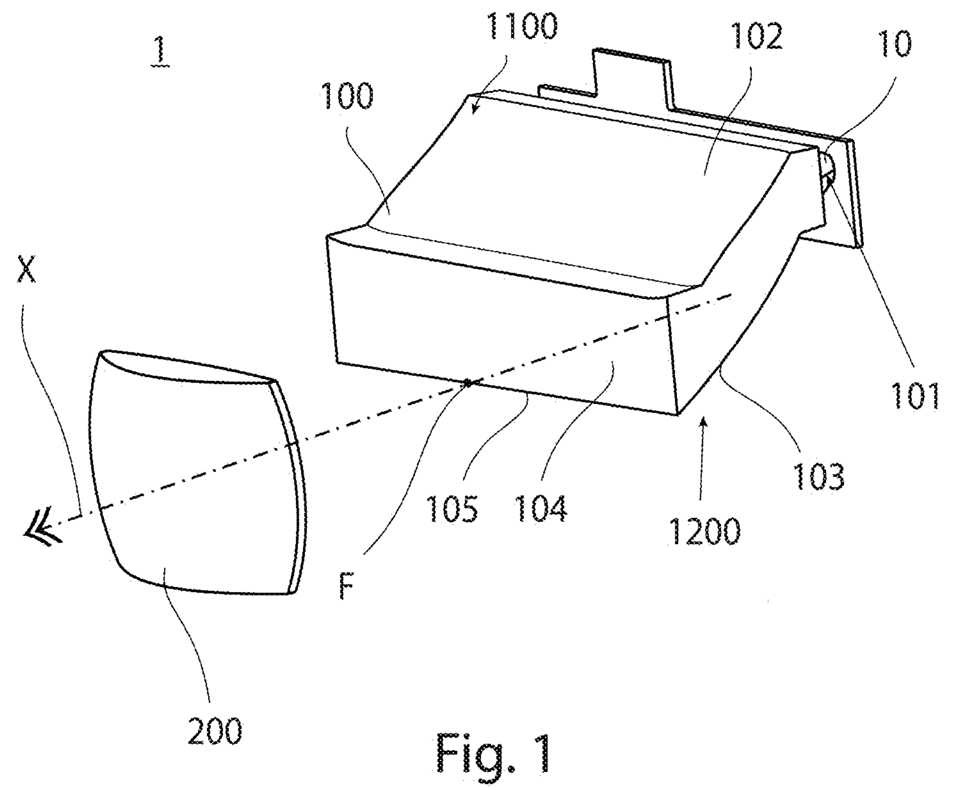
FIG. 1 shows a schematic perspective view of a lighting device according to the state of the art.

FIG. 1 shows a lighting device 1 for a vehicle, in particular a motor vehicle, the lighting device 1 comprising at least one light source 10 which is set up to emit light, a transparent light guide body 100, a light coupling area 101, which is set up to couple light emitted by the at least one light source 10 into the light guide body 100, and a projection optics device 200, for example a projection lens, with an optical axis X and a focal point F.

Typically, the light source comprises one or more LEDs. As can already be deduced from FIG. 1 and is easily recognizable with reference to FIG. 3, several light sources 10 are often provided, e.g. arranged side by side, e.g. in a row. A light coupling area 101 is provided for each light source 10, via which the light source 10 couples the light emitted by it into the light guide body 100.

The light coupling area is designed in such a way that the light is bundled in a desired direction and parallelized, for example.

The light guide body 100 comprises a light exit surface 104 and, on an underside 1200, a lower light deflection surface 103, the lower light deflection surface 103 and the light exit surface 104 converging in a common edge 105 which runs transversely, preferably perpendicularly, to the optical axis X of the projection optics device 200.

The edge 105 is located near the focus of the projection device 200, typically, as is known from the state of the art, in a small distance below the edge 105.

Light emitted by light sources 10 and coupled into the light guide body 100 propagates via the light coupling region 101—light bundle S1 with direction Y1—in the light guide body 100 to the light exit surface 104, emerges from the light guide body 100—light bundle S4, direction Y4—, passes through the projection optics device 200, and is imaged from the projection optics device 200 as a light distribution LV with a cut-off line HDG in a region in front of the projection optics device 200 (light beam S5, direction Y5), wherein the edge 105 being imaged as a cut-off line HDG in the light distribution (LV).

Figure 12:
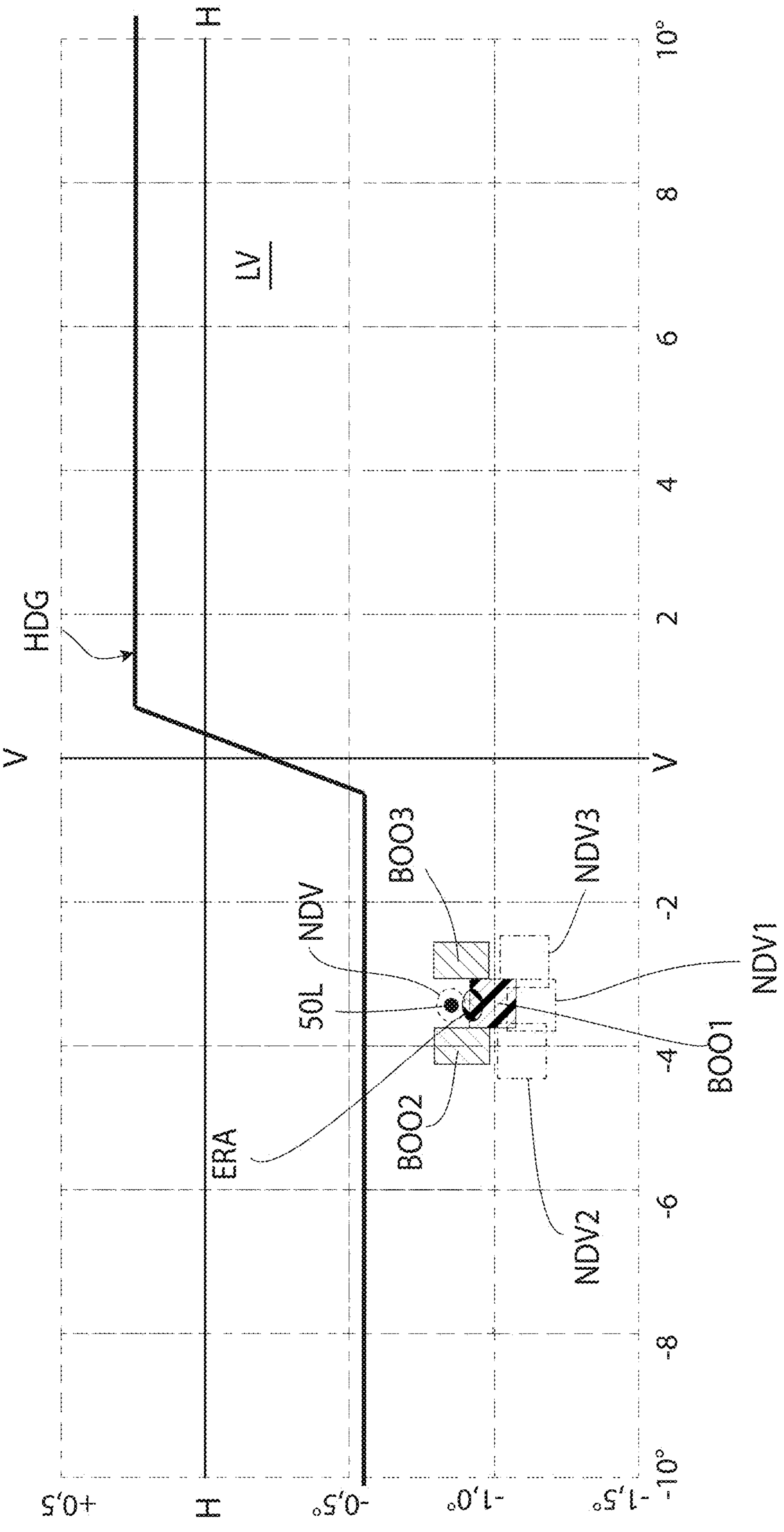
FIG. 12 schematically shows a dipped beam distribution in the area of the cut-off line and in the area of the defined point 50L.

A light distribution LV with cut-off line HDG is shown in FIG. 12.

In the shown embodiment, the light guide body 100 comprises an upper light deflection surface 102, on an upper side 1100, wherein at least a part of the light emitted by the light sources 10 and coupled into the light guide body 100 via the light coupling region 101 is totally reflected at the upper light deflection surface 102 and deflected to the lower light deflection surface 103 (light beam S2, direction Y2), wherein at least a portion of the light incident on the lower light deflecting surface 103 is totally reflected and deflected to the light emitting surface 104 (light beam S3, direction Y3), where it emerges from the light guide body 100 through the light exit surface 104.

The upper deflecting surface 102 may be curved or planar or faceted.

The lower light deflection surface 103 is formed in the shape of a base surface 500', wherein said shape is typically in form of a plane surface or a curved surface. For example, cutting the light guide body along cutting planes parallel to the longitudinal center plane may result in convex sectional curves for the base surface, for example with parabolic shape. These sectional curves may be identical in all parallel cutting planes, or they may have different radii of curvature in different cutting planes.

A typical problem that arises is that such lighting devices often produce too much light in a certain region of the light distribution LV. The present invention deals in particular with the amount of light in the region of a defined point, in particular the point 50L, see FIG. 12. Said defined point 50L lies below the cut-off line HDG of the light distribution LV.

In particular, light guide bodies known from the state of the art with such base surface produce a luminous intensity which is above a permissible maximum luminous intensity in said defined point 50L.

The defined point 50L is, in accordance with ECE regulation R 149/00 Suppl.7, located horizontally at −3.43° and vertically at −0.86° in the light distribution (for right-hand traffic). For left-hand traffic, this defined point may be point 50R, which is at +3.43° horizontally and −0.86° vertically. Regulation R 149 requires a luminous intensity<13200 candela for these points for Passing Beam Class C/Class V/Class W.

According to the invention, the shape of the lower light deflection surface 103 deviates in a region of deviation BER from the shape of a base surface 500', wherein said region of deviation BER is located laterally of a longitudinal center plane LE of the lighting device 1, which contains the optical axis X of the projection optics device 200. In the example shown, said region of deviation BER is on the right side of the longitudinal center plane LE, so that the luminosity distribution on the left side of the light distribution in relation to the V-V (where the point 50L is located) can be influenced.

In the region of deviation BER the shape of lower light deflection surface 103 deviates from the shape of the base surface 500' and is shaped in the form of a first facet 501, wherein said first facet 501 is a first surface element 501' of the deflection surface 103 which, starting at the edge 105 or in a defined distance from the edge 105, extends counter to the direction of the optical axis X.

In the example shown it is provided that the first surface element 501' starts directly at the edge 105, wherein preferably a section of the edge 105 forms a boundary curve, in particular a boundary straight line of the first surface element 501'.

As mentioned, the shape of the base surface 500' is such that in the case that the lower light deflection surface would not deviate from the shape of the base surface 500' in form of the first facet 501, the light reflected from the base surface 500' would be projected from the projection optics device 200 into a non-deviation region NDV of the light distribution LV, wherein the non-deviation region NDV contains a defined point 50L of the light distribution LV.

Figure 12A:
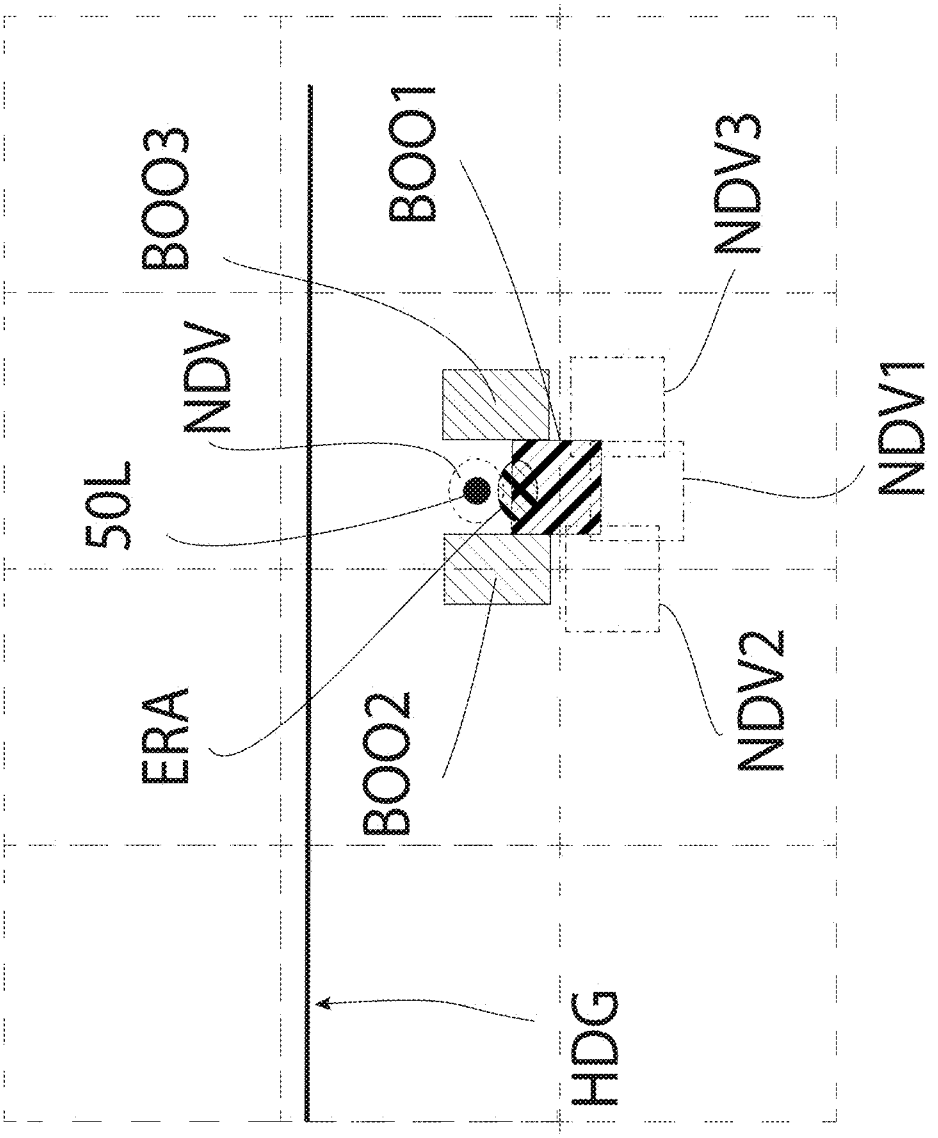
FIG. 12A shows an enlarged section of FIG. 12 in the area of the defined point.

The non-deviating region NDV as well as other regions in the light distribution LV, which will be mentioned in the following text, are schematically shown in FIGS. 12 & 12A.

Figure 3:
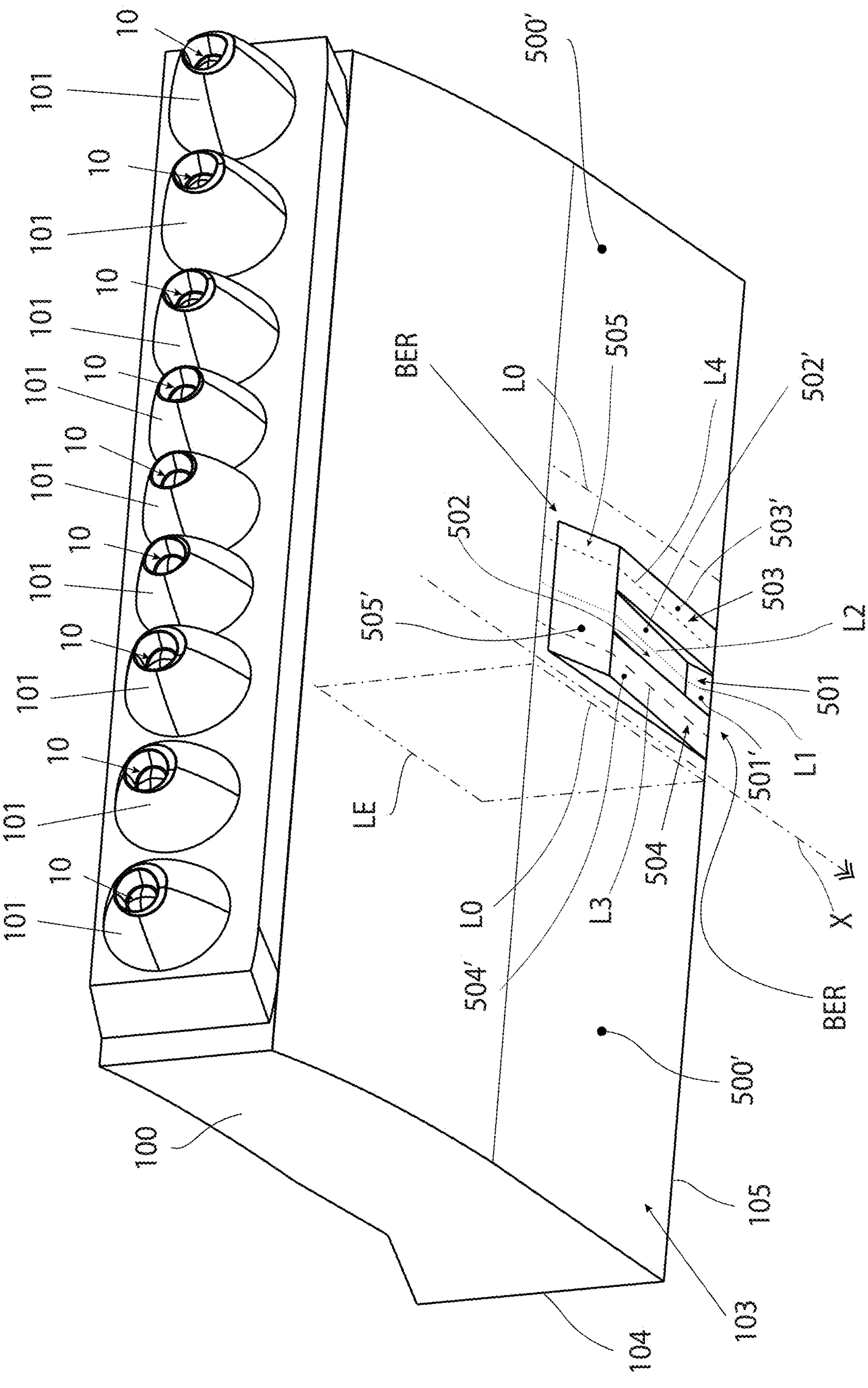
FIG. 3 shows in a perspective view, starting from a lighting device from FIG. 1, a lighting device modified according to the invention.

In the embodiment shown in FIG. 3, a second facet 502 is provided in the region of deviation BER, which is a second surface element 502' of the light deflecting surface 103, which second surface element 502 extends, adjacent to the first surface element 501', counter to the direction of the optical axis X. It may be provided, as shown, that the second surface element 502' directly adjoins the first surface element 501'.

The second surface element 502' is in a distance to the edge 105 of the transparent light guide body 100 (which is arranged close to the focal point F of the projection optics device 200), so that the light hitting the second surface element 502' comes from a slightly defocused area.

Additionally, a further, third facet 503 in the form of a surface element 503' is located laterally on a side of the first and second surface element 501', 502', and a further, fourth facet 504 in the form of a surface element 504' is located on the other side of the first and second surface elements 501', 502'. Preferably, said further facets 503, 504 have identical orientation.

In the example shown, the first and second surface element 501', 502' are of equal width, and the lateral boundary lines adjoin each other. The surface elements 501', 502', 503', 504' each may have a rectangular, as shown. The lateral extension of the first surface element can alternatively also widen or preferably taper backwards from the aperture edge 105 towards the second surface element. In this case, the resulting shape is a trapezoid. Similarly, the second surface element 502' can also preferably taper or widen. The same may apply for the at least one further surface elements.

In the example according to FIG. 3, the first, second, third and fourth facet 501, 502, 503, 504 each is in the form of a planar surface element 501', 502', 503', 504'.

Figures 10, 10A:
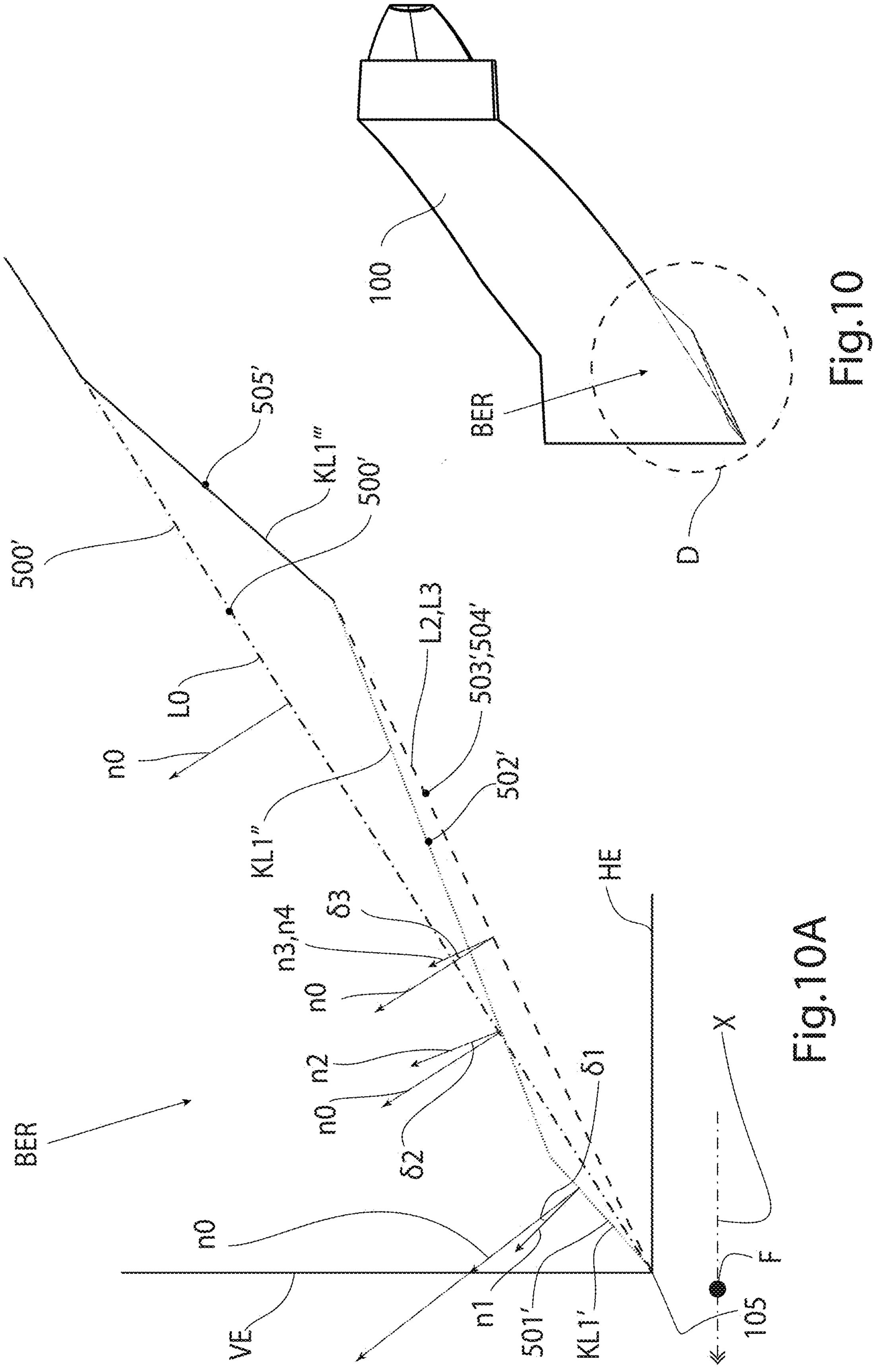
FIG. 10 shows the optical body in FIG. 3 in a side view.
FIG. 10A shows an enlarged schematic representation of detail D from FIG. 10.
Figure 10B:
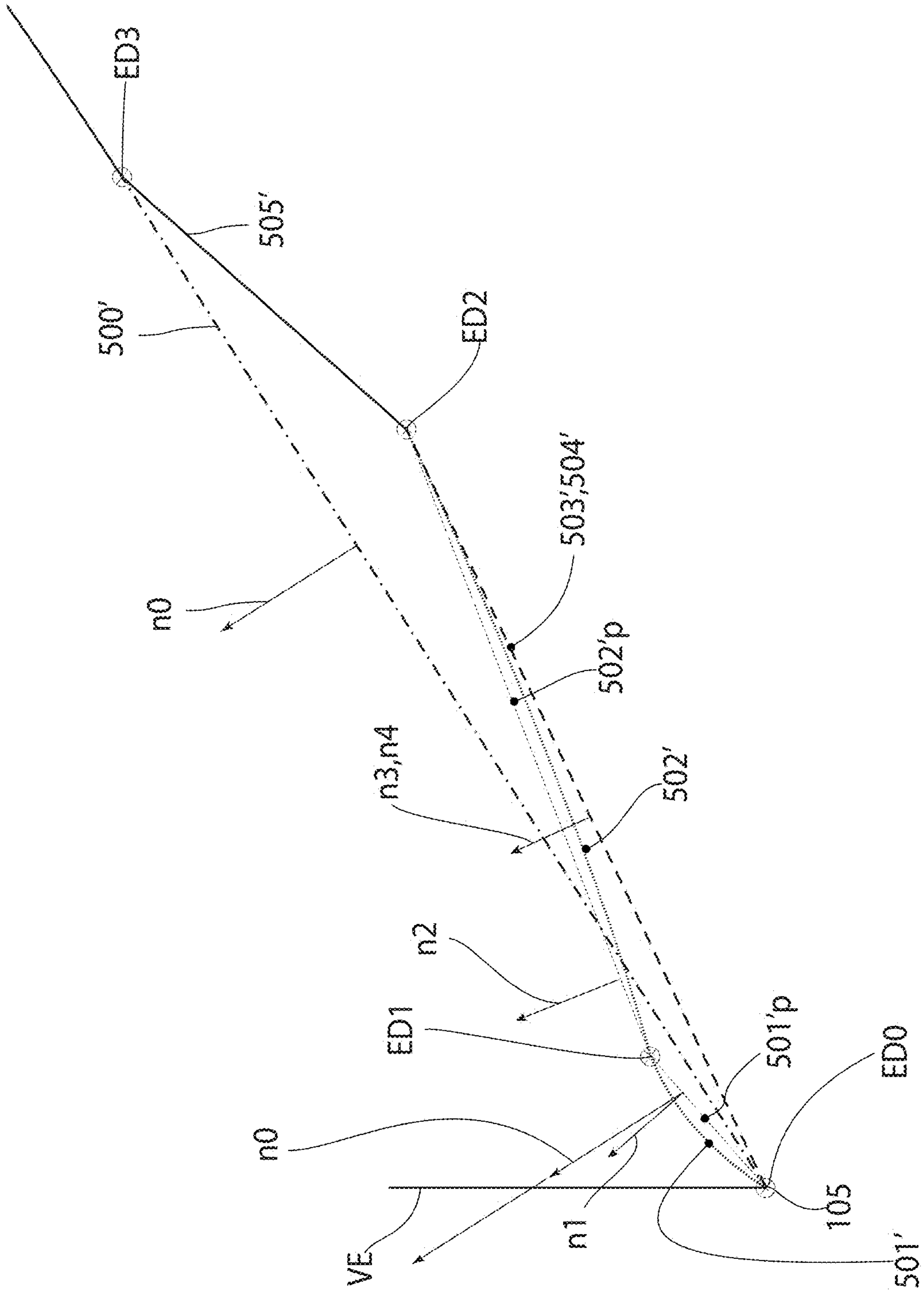
FIG. 10B shows an alternative design of the light guide body in the area of detail D of FIG. 10.

The orientation of each surface element 501', 502', 503', 504' is described by the orientation of its normal vector n1, n2, n3, n4 with respect to the normal vector no of the base surface 500'. The orientation of the normal vectors is shown in FIGS. 10A and 10B, which shows a detail D of the light guide body 100 of FIG. 10 (which corresponds to the light guide body 100 of FIG. 3). FIGS. 10A and 10B further schematically illustrate a representation of the region of deviation BER in a deviation coordinate system. In this representation, a horizontal axis HE denotes a horizontal deviation component, and a vertical axis VE denotes a vertical deviation component, each relative to a nominal or non-deviating light propagation direction. As shown in FIG. 10A, reference characters KL1', KL1'', and KL1''' denote different deviation limit curves or deviation boundaries within the region of deviation BER, each corresponding to a respective deviation condition or deviation threshold illustrated in the diagram. These deviation limit curves represent different degrees or levels of deviation of the light propagation caused by the inclination of the surface elements relative to the base surface. FIG. 10B further illustrates a combined deviation metric ED3, which represents a three-dimensional deviation distance derived from the horizontal deviation HE and the vertical deviation VE shown in FIG. 10A. The deviation distance ED3 provides an overall measure of the spatial deviation of the light propagation within the region of deviation BER.

Furthermore, a facet 505 (surface element 505') adjacent to the second, third and fourth facet is provided, which creates a transition to the base surface 500'.

In an approach, the shape of the base surface 500', which for example may be plane or curved, is approximated in the region of deviation BER by a plane surface, wherein said plane surface is a tangential plane surface to the base surface 500' in the edge 105. The normal vector no describing the orientation of the base surface 500' in the region of deviation BER in this case is the normal vector to said plane tangential surface.

FIG. 10A shows that the normal vector n1 of the first surface element 501' is inclined to the normal vector no of the base surface 500' in the region of deviation BER by an angle, the first angle δ1, which is unequal to zero, and wherein said first angle δ1 is selected such that at least a portion of the light incident on the first surface element 501' is totally reflected, strikes the projection optics device 200 and is imaged in the light distribution LV by the projection optics device 200 into a region ERA, the so-called "eraser region".

FIGS. 12 and 12A schematically illustrate the light distribution LV in a coordinate system defined by a horizontal direction H and a vertical direction V. The horizontal direction H corresponds to a horizontal angular direction of the emitted light distribution, and the vertical direction V corresponds to a vertical angular direction of the emitted light distribution. As further shown in FIGS. 12 and 12A, reference characters NV1, NV2, and NV3 denote respective non-deviating regions of the light distribution LV, in which light would be imaged by the projection optics device in the absence of deviation of the lower light deflecting surface in the form of the facets described above. The non-deviating regions NV1, NV2, and NV3 serve as reference regions for illustrating the effect of the eraser region ERA and the booster regions BOO1, BOO2, and BOO3 on the light distribution LV. The eraser region ERA is located below the defined point 50L, such that at least a portion of the light, which is total reflected by the first surface element 501', is projected into an area outside the defined point 50L in the light distribution LV.

Alternatively, it may be provided that said region contains the defined point 50L and is located lower (i.e., in a greater distance to the horizontal H-H-line at vertical angle)=0° in the light distribution LV compared to the non-deviating region NDV.

In both cases, the luminous intensity in the defined point 50L is reduced compared to the case of the lower surface not deviating in the form of the first facet 501.

With the first facet 501, light can be better distributed, i.e. part of the light that would be directed into and around the defined point 50L, where it would generate an excessive, impermissible light intensity, is shifted (slightly) downwards in the light distribution so that the light intensity in the defined point is reduced.

The second surface element 502' is inclined by a second angle δ2 to the normal vector no of the base surface 500' in the region of deviation BER, wherein said second angle δ2 is unequal to zero, wherein said second angle δ2 is selected such that at least a portion of the light S5" incident on the second surface element 502' is totally reflected, passes through the projection optics device 200 and is imaged in the light distribution LV by the projection optics device 200 into a region BOO1, the so-called "booster region" (FIGS. 12 & 12A), wherein said booster area BOO1 is located below the defined point 50L and above a non-booster region NBO1, into which non-booster region NBO1 light would be projected in the case that the lower light deflecting surface would not deviate in the form of the second facet 502 from the base surface 500'.

In a side view like FIG. 10A, where the optical axis X is directed from right to left, the first normal vector n1 of facet 501 is "rotated" counterclockwise with respect to the normal vector n0, whereas the second normal vector n2 of the second facet 502 is rotated clockwise with respect to the normal vector no of the base surface 500'.

This additional second surface element 502' allows an even better control of the light intensity. In particular, this second surface element allows to increase the light/luminous intensity at a region below the cut-off line, said region not containing the defined point 50L.

The third and fourth facet 503, 504 are described by the normal vectors n3, n4 the corresponding surface element 503', 504'. Said normal vectors are inclined by further, third and fourth angles δ3, δ4 to the normal vector no of the base surface 500' in the region of deviation BER, wherein said furthers angles δ3, δ4 are unequal to zero. In the embodiment shown the third and fourth angle are equal, δ3=δ4. Both angles δ3, δ4 are rotate clockwise with respect to the normal vector n0 of the base surface 500'.

At least a portion of the light incident on the further surface element 503', 504' is totally reflected, passes through the projection optics device 200 and is imaged in the light distribution LV by the projection optics device 200 into a further region BOO2, BOO3, the so-called "further booster region" (third and fourth booster region), wherein said further booster area BOO2, BOO3 is located above a non-booster region NBO2, NBO3, into which non-booster region NBO2, NBO3 light would be projected in the case that the lower light deflecting surface would not deviate in the form of the further facet 503, 504 from the base surface 500'.

As shown in FIGS. 12 & 12A, the further booster regions BOO2, BOO3 are located to the sides of the defined point 50L and preferably do not contain said defined point 50L. The lateral additional facets 503, 504 act as light boosters and bring more light up to the cut-off line in horizontal angle ranges lateral to the defined point 50L. For example, as shown, the defined point is at 0.86° down and 3.434° left, corresponding to (−3.434°, −0.86°), and one additional lateral facet (which is arranged on one side of the first and second facet) directs light into the region left of the defined point 50L from approximately −4.4° to −3.7° horizontal and another lateral facet (which is arranged on the other side of the first and second fact) into a region right of the defined point 50L from approximately −3.2° to −2.5°.

In the embodiment shown the normal vector n1-n4 are parallel to a longitudinal center plane LE (see FIG. 3). Accordingly, the surface elements 501'-504' have no lateral tilt.

Typically, the first, second, third and fourth angles δ1, δ2, δ3, δ4 each have a value in the range from 0.25° and 4°. Preferred ranges are 1° to 4° for the first angle δ1, 0.5° to 2° for the second angle δ2, and 0.25° to 2° for the third/fourth angle δ3, 84.

Referring again to FIG. 3, lines L0, L1, L2, L3, L4 are recognizable there, and FIGS. 4-9 show vertical sections through the light guide body 100, the respective sectional planes running parallel to the longitudinal central plane LE and each containing some of the said lines.

Figure 2:
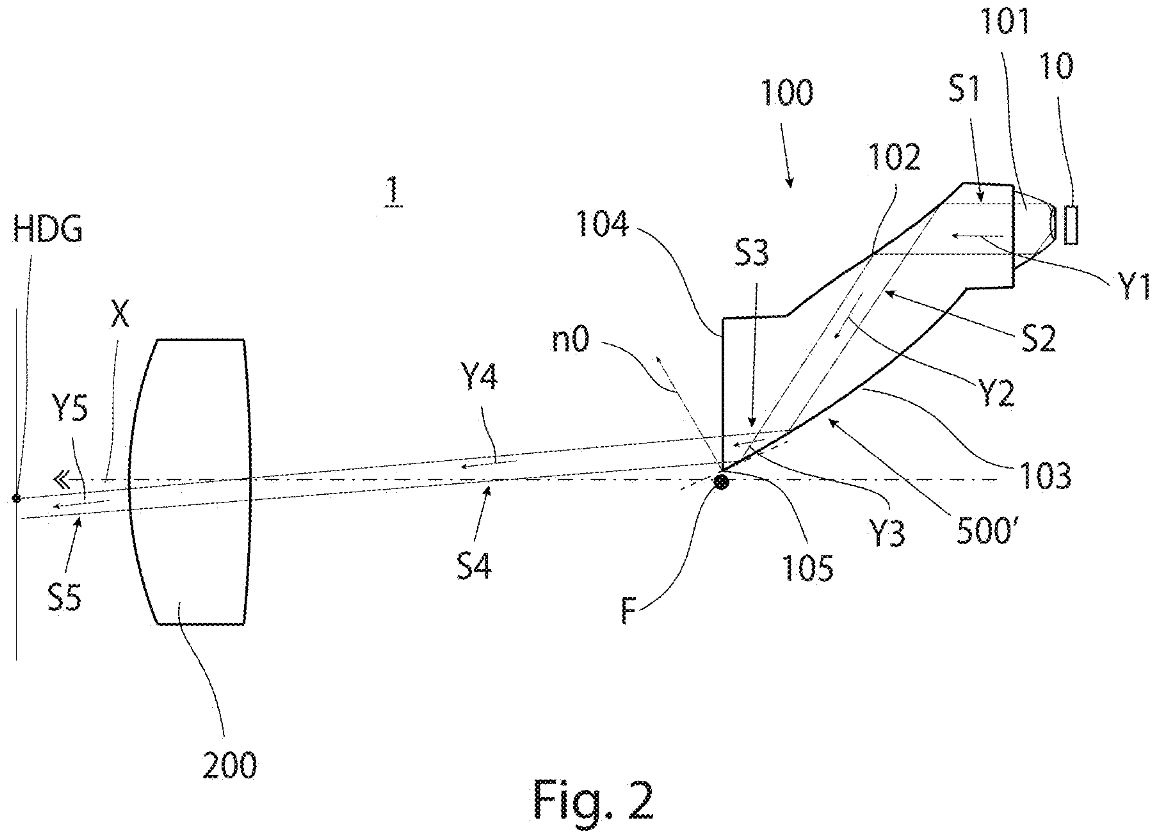
FIG. 2 shows a section along the vertical longitudinal center plane through the lighting device of FIG. 1.
Figure 4:
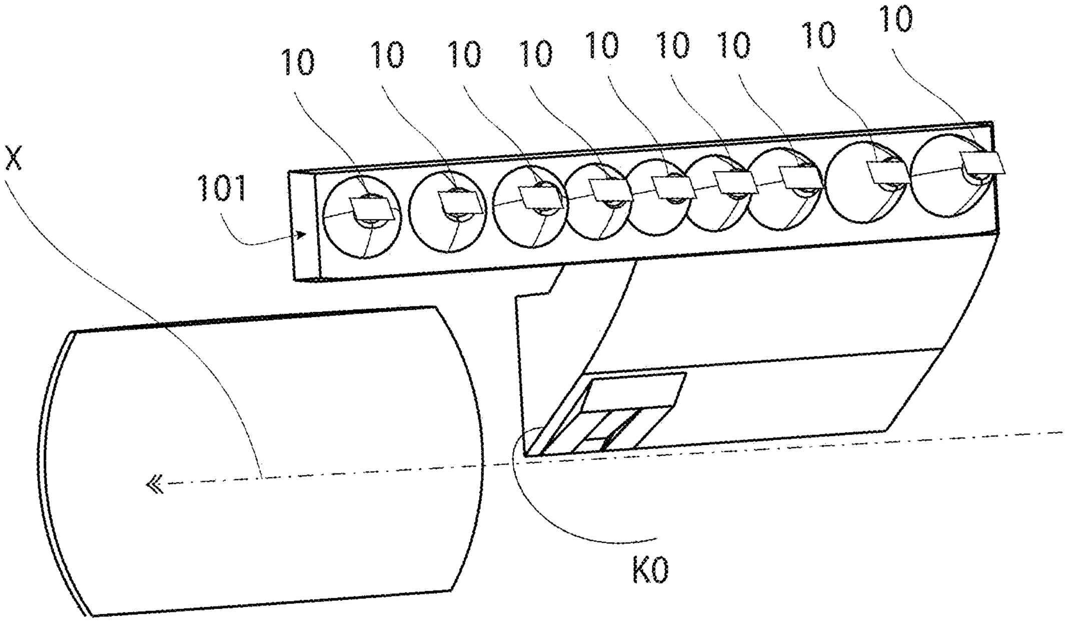
FIG. 4 shows the lighting device of FIG. 3, in a partially sectioned view, along the vertical longitudinal center plane.
Figure 5:
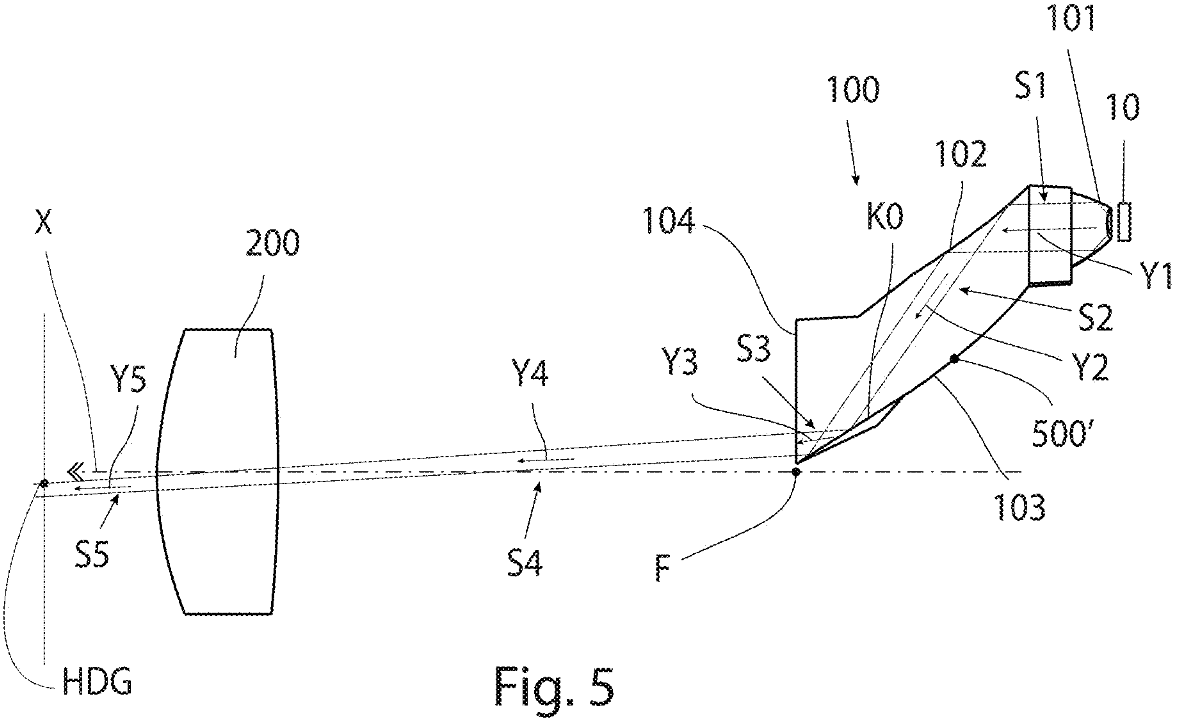
FIG. 5 shows the section from FIG. 4 in a side view.

FIGS. 4 and 5 show such a vertical section by the longitudinal central plane LE, which contains the line L0 (namely the left-hand line L0 in FIG. 3). The contour K0 that results in this section corresponds to the base surface 500' and thus corresponds to the contour as shown in FIG. 2. The light propagation in this section is the same as in the light guide body 100 in FIG. 2.

Figure 6:
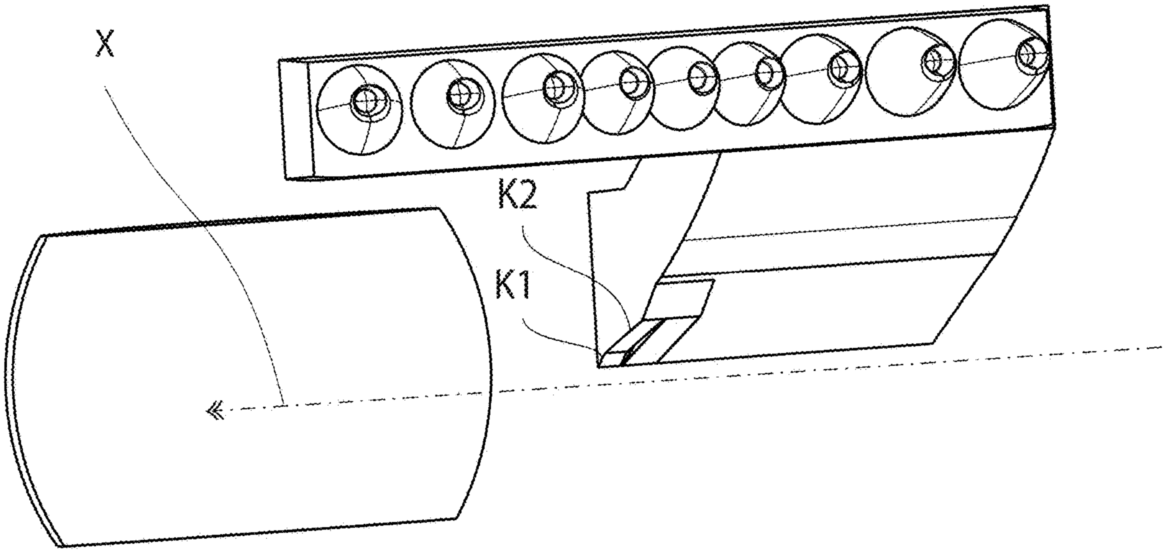
FIG. 6 shows the lighting device of FIG. 3, in a partially sectioned view, along a plane parallel to the vertical longitudinal center plane.
Figure 7:
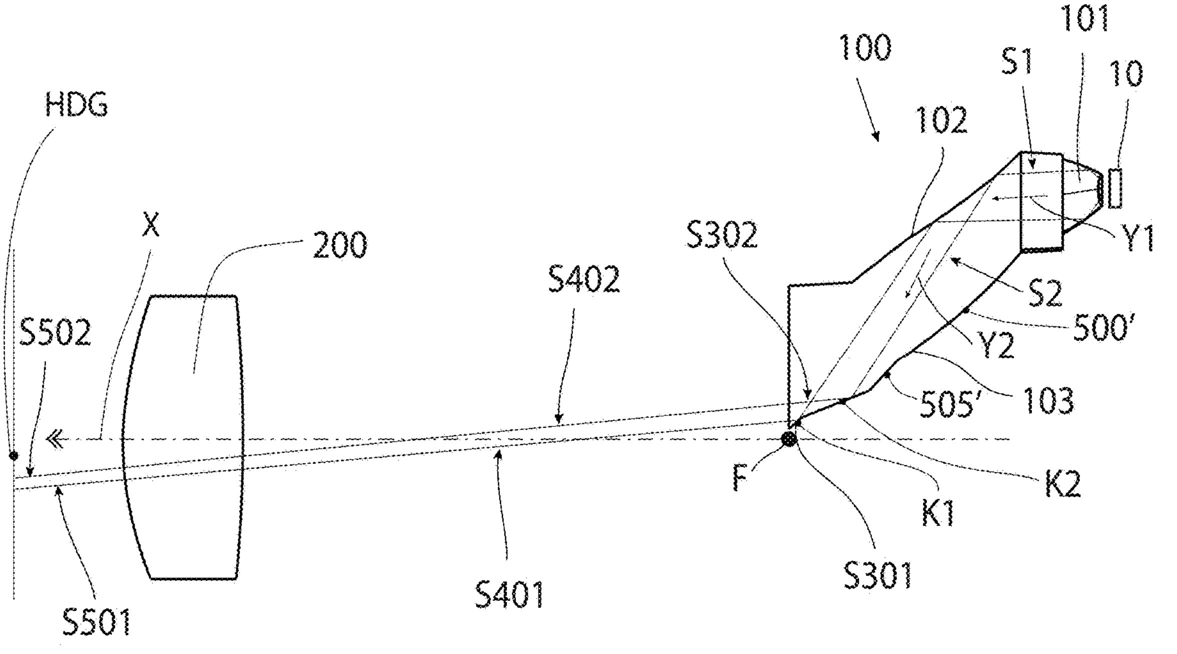
FIG. 7 shows the section from FIG. 6 in a side view.

FIGS. 6 and 7 show a further vertical section containing the lines L1 and L2. This vertical section therefore runs through the first and second facets 501, 502. The result is a contour K1 of the first facet 501 and a contour K2 of the second facet 502 and a light path of the light rays S301 and S302 totally reflected by these facets 501, 502 and correspondingly modified light rays S401, S402, S501, S502, which emerge from the light guide body 100 or from the projection optics device 200.

Figure 8:
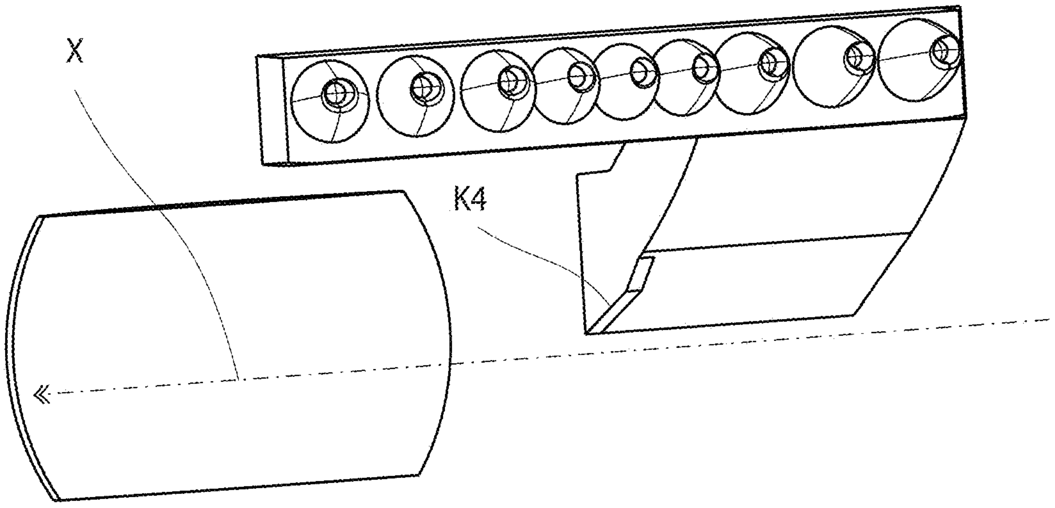
FIG. 8 shows the lighting device of FIG. 3, in a partially sectioned view, along another plane parallel to the vertical longitudinal center plane.
Figure 9:
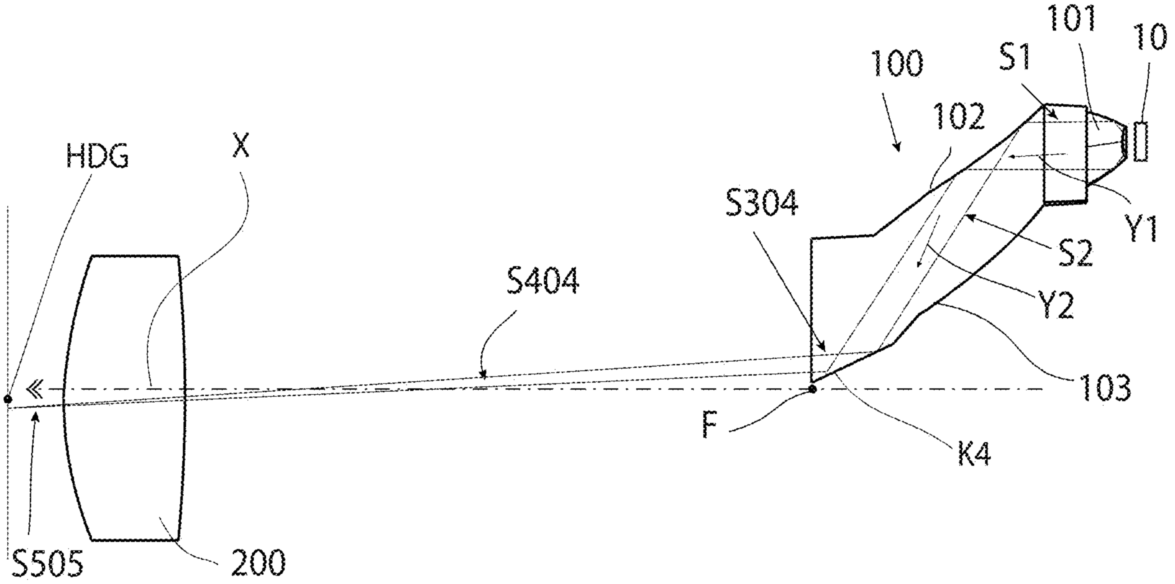
FIG. 9 shows the section from FIG. 8 in a side view.

FIGS. 8 and 9 show a further vertical section containing line L4. (The section with line L3 is identical and is therefore not shown separately.) This vertical section thus runs through the fourth facet 504. This results in a contour K4 of the fourth facet 504 and a correspondingly modified light path of the light beams S304 totally reflected by this facet 504 and correspondingly modified light beams S404, S504, which emerge from the light guide body 100 and from the projection optics device 200, respectively.

The changes in the light path compared to the base surface 500' result in the effects in the light image described above.

Now, reference is made to FIG. 11*b*. As already mentioned above one, some or all of the surface elements 501'-504' may be curved, preferably slightly curved, for example said surfaces are concave or convex. Preferably, the radius of curvature is at least 5 times the lengths of a facet.

These curved surface elements are also described by a normal vector on this surface elements. For a definition of said surface element by normal vectors, each surface element is approximated by a plane surface. For example, each surface element is bounded by a front, straight edge facing the projection optics device and a rear, straight edge facing the light source. These two straight edges are preferably parallel to each other. The curved surface element is approximated as a flat surface containing the two edges, the normal vector to this flat surface corresponds to the normal vector of the curved surface.

In detail, the first convex surface element 501' (from edge 105/ED0 to edge ED1) is approximated by a plane surface 501'*p* with normal vector n0. The second concave surface element 502' (from edge ED1 to edge ED2) is approximated by a plane surface 502'*p* with normal vector n2. The surface elements 503', 504' are in this embodiment plane by default. The base surface 500' in the region of deviation BER extends from edge 105/ED0 to edge ED2. If the base surface 500' were curved in this region, it would be approximated by a flat surface between these two edges.

In contrast to the embodiments described above, it may also be provided that coupled-in light strikes the one or more or all facets without prior deflection on an upper light deflection surface. In this case, light which is coupled into the transparent light guide body may travel directly, without any deflection/reflection into the region of deviation BER, where it is totally reflected by the one or more facets as described above.

Figure 11:
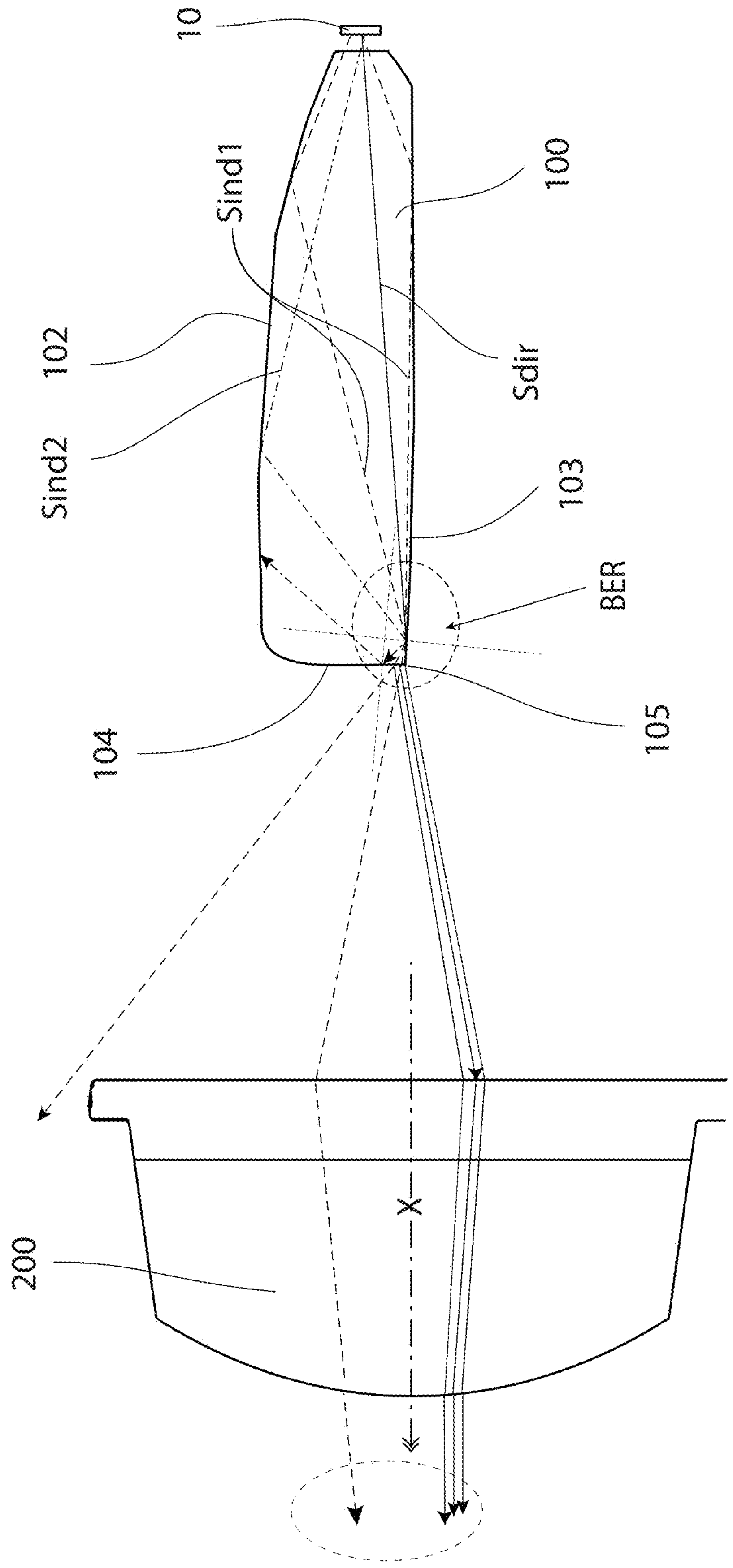
FIG. 11 shows schematically in a side view a further embodiment of a lighting device according to the invention.

FIG. 11 shows a light guide body 100 of another embodiment, where coupled-in light Sdir travels without deflection into the region of deviation BER at the lower deflection surface 103, where it is reflected on facets as described in the embodiments above with the corresponding effects on the light distribution as described above.

In addition, a portion of the light Sind1 reflected from an upper deflection surface 102 that strikes the facets flat in the region of deviation BER is also directed to the projection optics device 200 and acts as described above.

Other light rays Sind2 reflected on the upper surface 102 hit the region of deviation BER too steeply and do not contribute to the light distribution LV.

The invention claimed is:

1. A lighting device (1) for a motor vehicle, the lighting device (1) comprising:

at least one light source (10) which is set up to emit light;

a transparent light guide body (100);

a light coupling area (101), which is set up to couple light emitted by the at least one light source (10) into the light guide body (100); and a projection optics device (200) with an optical axis (X) and a focal point (F), wherein the light guide body (100) comprises a light exit surface (104) and a lower light deflection surface (103), the lower light deflection surface (103) and the light exit surface (104) converging in a common edge (105) which runs transversely to the optical axis (X) of the projection optics device (200), wherein light emitted by the at least one light source (10) and coupled into the light guide body (100) via the light coupling region (101) propagates in the light guide body (100) to the light exit surface (104), emerges from the light guide body (100), passes through the projection device (200), and is imaged from the projection optics device (200) as a light distribution (LV) with a cut-off line (HDG) in a region in front of the projection optics device (200), the common edge (105) being imaged as a cut-off line (HDG) in the light distribution (LV), wherein at least part of the light propagating in the light guide body (100) is totally reflected at the lower light deflection surface (103) before it emerges from the light guide body (100) through the light exit surface (104), wherein the shape of the lower light deflection surface (103) deviates in a region of deviation (BER) from the shape of a base surface (500'), and wherein said region of deviation (BER) is located laterally of a longitudinal center plane (LE) of the lighting device (1), which contains the optical axis (X) of the projection optics device (200), wherein in the region of deviation (BER) the lower light deflection surface (103), deviating from the shape of the base surface (500') is shaped in the form of a first facet (501), wherein said first facet (501) is a first surface element (501') of the deflection surface (103) which, starting at the common edge (105) or in a defined distance from the common edge (105), extends in a direction that is away from and opposed to the direction of the optical axis (X wherein the shape of the base surface (500') is such that in the case that the lower light deflection surface would not deviate from the shape of the base surface (500') in form of the first facet (501), the light reflected from the base surface (500') would be projected from the projection optics device (200) into a non-deviation region (NDV) of the light distribution (LV), wherein the non-deviation region (NDV) contains a defined point (50L) of the light distribution (LV), wherein the defined point (50L) lies below the cut-off line (HDG) of the light distribution (LV), and wherein a normal vector (n1) of the first surface element (501') is inclined to a normal vector (n0) of the base surface (500') in the region of deviation (BER) by an angle, the first angle (δ1), unequal to zero, wherein said first angle (δ1) is selected such that at least a portion of the light incident on the first surface element (501') is totally reflected, strikes the projection optics device (200) and is imaged in the light distribution (LV) by the projection optics device (200) into a region (ERA), the so-called “eraser region”, which:

is located below the defined point (50L), such that at least a portion of the light, which is totally reflected by the first surface element (501'), is projected into an area outside the defined point (50L) in the light distribution (LV), or contains the defined point (50L) and is located lower in the light distribution (LV) compared to the non-deviating region (NDV), such that the luminous intensity in the defined point (50L) is reduced compared to the case of the lower surface not deviating in the form of the first facet (501).

2. The lighting device according to claim 1, wherein in the region of deviation (BER) a second facet (502) is provided, which is a second surface element (502') of the light deflecting surface (103), which second surface element (502) extends, adjacent to the first surface element (501'), counter to the direction of the optical axis (X), wherein the second surface element (502') is inclined by a second angle (82) to the normal vector (n0) of the base surface (500') in the region of deviation (BER), wherein said second angle (82) is unequal to zero, and wherein said second angle (82) is selected such that at least a portion of the light (S5") incident on the second surface element (502') is totally reflected, strikes the projection optics device (200) and is imaged in the light distribution (LV) by the projection optics device (200) into a region (BOO1), the so-called "booster region", wherein said booster area (BOO1) is located below the defined point (50L) and above a non-booster region (NBO1), into which non-booster region (NBO1) light would be projected in the case that the lower light deflecting surface would not deviate in the form of the second facet (502) from the base surface (500').

3. The lighting device according to claim 1, wherein at least one further facet (503, 504) in the form surface element (503', 504') is provided laterally on at least one side of the first and/or the second surface element (501', 502').

4. The lighting device according to claim 3, wherein a normal vector (n3, n4) of the at least one further surface element (503', 504') is inclined by at least one further angle (δ3, δ4) to the normal vector (n0) of the base surface (500') in the region of deviation (BER), wherein said at least one further angle (δ3, δ4) is unequal to zero, wherein the further angle (δ3, δ4) of a further surface element (503', 504') is selected such that at least a portion of the light (S5") incident on the further surface element (503', 504') is totally reflected, passes through the projection optics device (200) and is imaged in the light distribution (LV) by the projection optics device (200) into a further region (BOO2, BOO3), the so-called "further booster region", wherein said further booster area (BOO2, BOO3) is located above a non-booster region (NBO2, NBO3), into which non-booster region (NBO2, NBO3) light would be projected in the case that the lower light deflecting surface would not deviate in the form of the further facet (503, 504) from the base surface (500').

5. The lighting device according to claim 3, wherein the at least one further booster region (BOO2, BOO3) is located to the side of the defined point (50L) and does not contain said defined point (50L).

6. The lighting device according to claim 3, wherein at least one further facet (503, 504) is provided on each side of the first and/or the second facet (501, 502), wherein said further facets (503, 504) have identical orientation.

7. The lighting device according to claim 1, wherein at least one of the first facet, the second facet, or the at least one further facet (501, 502, 503, 504) is in the form of a planar surface element (501', 502', 503', 504').

8. The lighting device according to claim 1, wherein the light guide body (100) comprises an upper light deflection surface (102), and wherein at least a part of the light emitted by the at least one light source (10) and coupled into the light guide body (100) via the light coupling region (101) is totally reflected at the upper light deflection surface (102) and deflected to the lower light deflection surface (103), wherein at least a portion of the light incident on the lower light deflecting surface (103) is totally reflected and deflected to the light emitting surface (104), and wherein a portion of the light impinging on the lower light deflecting surface (103) impinges on the at least one facet (501, 502, 503, 504).

9. The lighting device according to claim 1, wherein coupled-in light strikes at least one of the facets (501, 502, 503, 504) without prior deflection.

10. The lighting device according to claim 1, wherein the first surface element (501') starts directly at the common edge (105), wherein a section of the common edge (105) forms a boundary straight line of the first surface element (501').

11. The lighting device according to claim 1, wherein the second surface element (502') directly adjoins the first surface element (501').

12. The lighting device according to claim 1, wherein at least one of the first surface element (501'), the second surface element (502'), or the at least one further surface element (503', 504') has a rectangular or square shape.

13. The lighting device according to claim 1, wherein at least one of the normal vector (n1) of the first surface element (501'), the normal vector (n2) of the second surface element (502'), or the normal vector (n3, n4) of the at least one further surface element (503', 504') is parallel to a longitudinal center plane (LE).

14. The lighting device according to claim 1, wherein at least one of the following conditions is met:

the first angle (δ1) between the normal vector (n1) of the first surface element (501') and the normal vector (n0) of the base surface (500') is in a range from 0.25° to 4°, the second angle (δ2) between the normal vector (n2) of the second surface element (502') and the normal vector (n0) of the base surface (500') is in a range from 0.25° to 4°, the at least one further angle (δ3, δ4) between the normal vector (n3, n4) of the at least one further surface element (503', 504') and the normal vector (n0) of the base surface (500') is in a range from 0.25° to 4°, or the normal vector (n2, n3, n4) of the second and of the at least one further surface element (502', 503', 504') is inclined to the opposite as the normal vector (n1) of the first surface element (501') with respect to a plane containing the normal vector (n0) of the base surface (500').

15. The lighting device according to claim 1, wherein the base surface (500') is designed in such a way that without modification by the first facet (501) the light distribution at the defined point (50L) would have a luminous intensity which is above a permissible maximum luminous intensity in said defined point (50L).

16. The lighting device according to claim 1, wherein the upper deflecting surface (102) is curved, planar, or faceted.

17. A motor vehicle headlight comprising at least one lighting device (1) according to claim 1.

18. A motor vehicle comprising at least one lighting device according to claim 1.

19. The lighting device according to claim 1, wherein the projection optics device is a projection lens.

20. The lighting device according to claim 14, wherein:

the first angle (δ1) between the normal vector (n1) of the first surface element (501') and the normal vector (n0) of the base surface (500') is in a range from 1° to 4°, the second angle (δ2) between the normal vector (n2) of the second surface element (502') and the normal vector (n0) of the base surface (500') is in a range from 0.5° to 2°, and the at least one further angle (δ3, δ4) between the normal vector (n3, n4) of the at least one further surface element (503', 504') and the normal vector (n0) of the base surface (500') is in a range from 0.25° to 2°.

* * * * *